Figure 1:
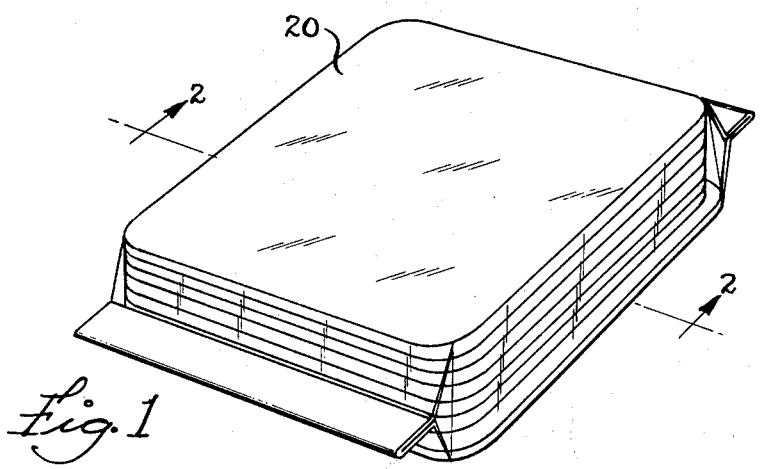

March 31, 1964 K. F. WEINKE 3,127,274
MEAT PACKAGE
Filed Feb. 12, 1962

INVENTOR.
KARL F. WEINKE
BY *Frank S. Charlton*
AGENT
ATTORNEY

United States Patent Office
3,127,274
Patented Mar. 31, 1964

3,127,274
MEAT PACKAGE
Karl F. Weinke, Neenah, Wis., assignor to American Can Company, New York, N.Y., a corporation of New Jersey
Filed Feb. 12, 1962, Ser. No. 174,349
8 Claims. (Cl. 99—174)

This invention relates to the packaging of moist food products and to a means for the prevention of the deteriorative effects of oxygen thereon. In one of its particular aspects, the invention relates to a package for cured meat products such as luncheon meat, the package including as a component thereof a backing board bearing an oxygen scavenger which effectively eliminates the oxidative deterioration to which the packaged meat product is normally subject.

Oxygen is well known to have a deleterious effect on both the color and flavor of many food products, including cured meat products such as luncheon meats and the like. In recent years, attempts have been made to retard the oxidative degradation of such products by vacuum packaging procedures and flushing of the packages with inert gases to remove oxygen from the package interior atmosphere. Such practices have significantly improved the shelf-life of various packaged products. It is, however, extremely difficult to remove all traces of oxygen from packages of food products by mechanical means, and the color and flavor of certain foods, notably luncheon meats, are seriously affected by the relatively small amounts of residual oxygen not removed from the package by vacuum packaging and gas flushing processes as well as by the small amounts of oxygen which permeate the relatively gas-impermeable flexible packaging sheet materials presently available commercially. In order to satisfactorily preserve the color and flavor of such products, even the last traces of oxygen must be removed from the package and the package maintained oxygen-free throughout the entire expected shelf-life of the product.

A method has been described for removing the free oxygen from a system by an enzyme system comprising glucose oxidase and catalase which, together with glucose and in the presence of water, results in the absorption of oxygen by conversion of glucose to gluconic acid. In U.S. Reissue Patent No. 23,523 is disclosed the use of this system for the removal of free oxygen from food and other material by addition of glucose oxidase and catalase to a food product containing water and glucose. The procedure disclosed in Reissue Patent No. 23,523 is not satisfactory for the removal of oxygen from luncheon meat packages, however, because contact of the enzyme ingredients with the meat product results in the appearance of a very undesirable greenish-brown color on the surface of the meat.

In accordance with one embodiment of the present invention, a package for cured luncheon meat is provided whereby an oxygen-free atmosphere is maintained within the package and the product retains its fresh-cured color and flavor during extended periods of storage. The luncheon meat package includes a backing board, suitably of paperboard, which serves the dual purpose of providing a relatively stiff support for the food product and also carries an enzyme system comprising glucose oxidase and catalase which, through catalyzing the oxidation of a portion of the glucose normally present in the cured meat product effectively removes oxygen from within the package and maintains the system in an oxygen-free state throughout the expected shelf-life of the package. Interposed between the enzyme system and the meat product itself is a membrane which is freely permeable to both water and oxygen but which serves to prevent direct contact between the food product and the enzyme system. The assembly is enclosed in a flexible sheet material wrapper of a suitable material having a very low water, water vapor and gas permeability. Preferably the wrapper is transparent and should be heat-sealing so that a hermetically sealed package having excellent product visibility may be readily produced.

Figure 2:
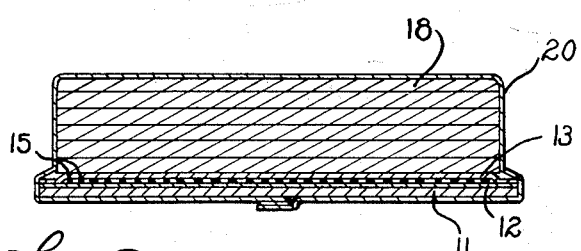
Figure 3:
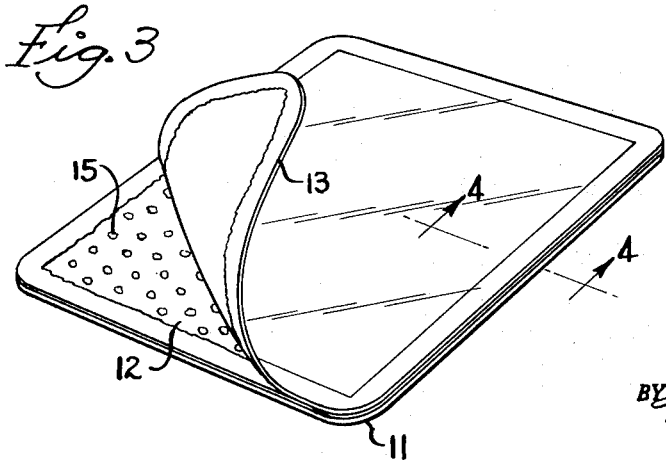

In order to illustrate the particular features of interest and importance in the package of the present invention, reference will now be made to the accompanying drawings, in which:

FIGURE 1 is a perspective view of a package of luncheon meat embodying the principles of the invention.
FIGURE 2 is a cross-sectional view, somewhat enlarged, of the package of FIGURE 1, taken along line 2—2 of FIGURE 1.
FIGURE 3 is a perspective view of the backing board bearing the enzymatic oxygen scavenger and the covering paper sheet which are essential components of the invention and
FIGURE 4 is an enlarged cross-sectional view of the composite backing or supporting panel taken along line 4—4 of FIGURE 3.

Figure 4:
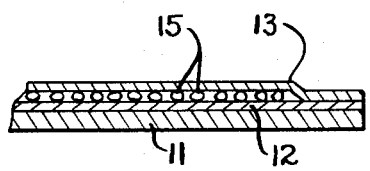

With particular reference to FIGURES 3 and 4, the package includes a backing board 11, of substantially the same area as an individual slice of the luncheon meat which is to be packaged thereon.

A thermoplastic adhesive material 12 is coated on one side of the backing board at least in its marginal areas, the thermoplastic adhesive serving to adhere a thin, water and gas-permeable paper or parchment membrane 13 to the marginal areas of the backing board. The centrally located portion of the upper surface of the backing board within the marginal areas is left unadhered to the covering permeable paper membrane, and the enclosure or pocket area so formed contains the oxygen-scavenging enzyme system in the form of a dry crystalline powder blend 15.

As best illustrated in FIGURES 1 and 2, the cured luncheon meat product 18 is superimposed on the water and gas permeable paper membrane 13 and the whole assembly is hermetically sealed within an exterior wrapper 20 of a flexible sheet material having very low permeability to gases, water and water vapor to form the completed food package depicted in FIGURE 1.

The backing board 11 may be of any suitable material having a moderate degree of stiffness or rigidity and is most suitably formed of paperboard of a thickness ranging upwards of about 0.012 inch, the stiffness of the board normally increasing with caliper. A thickness of greater than about 0.017 inch is generally superfluous and therefore economically undesirable. It is generally preferable that the backing board conform essentially in area and contour to the food product it supports, although it may be desirable to extend the board somewhat beyond the limits of the food product in certain cases and it is also quite possible to extend the backing board sufficiently so that it can be suitably scored and the extended portions folded upwardly to enclose the sides of the meat product.

The thermoplastic coating 12 may be applied only to the marginal areas of the backing board or may conveniently comprise an over-all one-side or two-side coating of a thermoplastic material such as polyethylene or a petroleum wax composition which serves not only as the sealant for adhering the permeable paper membrane thereto but also to prevent undue softening of the backing board by the moisture contained in the meat product or by the water released during the reaction of the enzyme system with the free oxygen in the package.

The oxygen scavenging enzyme system which is applied to the backing board in the form of finely divided, dry, crystalline powder 15, comprises a mixture of glucose oxidase and catalase, and may, if desired, also include glucose and/or an inert diluent. As applied in the dry form, the glucose oxidase-catalase mixture is inactive toward oxygen, but becomes activated by the presence of moisture and glucose, normally supplied in the completed package by the meat product 18 and transmitted to the enzyme system by permeation through the water-and-gas permeable membrane 13.

Since the action of the enzyme system is catalytic in nature, only very small amounts of the enzymes need be present in the package to initiate and effectively maintain the reaction which results in the removal of oxygen. It has been determined that as little as 1 to 10 milligrams of a blend of glucose oxidase and catalase of roughly equivalent activity (preferably an activity ratio between 1 to 1 and 2 to 1) is quite sufficient for inclusion in the customary consumer-sized package containing 4-8 ounces of cured luncheon meat, assuming that the meat product, itself, contains glucose, the other essential component of the reaction, in excess of the amount necessary to react with all the oxygen remaining within the package. Normally, cured luncheon meats contain glucose, or sugars which readily convert to glucose, in an amount substantially in excess of that required for the oxygen-scavenging system. If desired, of course, glucose or a material convertible to glucose may be blended directly with the enzyme system itself, and this assures an abundant supply of the glucose component of the reaction and relieves, in part, the difficulties inherent in handling, measuring and applying with accuracy the very small amounts of the enzymes which are necessary in the oxygen-scavenging system. Thus in order to increase the ease of handling or to ensure the presence of an excess of glucose in the package, it is often convenient to blend the active enzyme ingredients with from 1 to several hundred times their weight of glucose, lactose, or, if the meat product contains glucose in abundance, with an inert diluent such as starch, wheat flour or similar finely divided material. The active enzyme ingredients, or their blend with a diluent, are applied to the central area of the backing board 11 as a dry powder and covered with the gas and water permeable paper membrane, which is then sealed with heat and pressure to the marginal areas of the backing board, thereby enclosing the dry enzyme system in the sealed envelope thus formed.

The membrane 13 which covers the dry, crystalline oxygen scavenging enzyme system is a fibrous cellulose sheet, suitably a sheet of light weight paper, a 12–25 pound per ream (3000 square feet) tissue being quite satisfactory for the purpose, especially if a wet-strength resin has been incorporated in the sheet. Such a paper membrane is highly permeable to water and to various gases, presenting little or no barrier to their passage. The presence of this membrane is, however, necessary in order to prevent the objectionable discoloration of luncheon meat which occurs when the enzyme system contacts the meat surface directly.

The exterior wrapper 20 may be any of a number of flexible sheet materials which have a very low permeability to water vapor and to various gases, particularly oxygen. Preferably the wrapper should be heat-sealing in order to readily form a hermetically sealed package. A particularly satisfactory wrapper for this purpose consists of a regenerated cellulose sheet or polyester sheet coated with a modified polyvinylidine chloride (saran) lacquer coating and in addition having a layer of polyethylene extrusion-coated over the saran coating on one side of the sheet. The side of the sheet bearing the polyethylene coating is placed in contact with the meat product. Other satisfactory outer wrappers are polyvinylidine chloride or polyethylene terephthalate bearing heat sealing coatings, and similar films. To be satisfactory for this application, the oxygen permeability of the sheet should be less than about 20 milliliters of oxygen per square meter per 24 hours, measured under standard test conditions of 73° F. and 50% relative humidity. The oxygen permeability test is described in Paper Trade Journal, 123, No. 9, 33–40 (August 29, 1946). The permeability to water vapor is less critical, it being only necessary that it be relatively low so that the meat product does not suffer appreciably from desiccation during the period of normal shelf-life of the package. Sheet materials having a water vapor permeability of less than about 10 grams of water per square meter per 24 hours under the TAPPI standard accelerated test (T-464) conditions of 100° F. and 90% relative humidity have proven quite satisfactory for this use.

In a preferred manner for forming the package of the present invention, the freshly cured, sliced luncheon meat is placed on the composite backing panel bearing the oxygen scavenging enzyme system in the dry, inactive state. The moist meat product is in direct contact with the moisture-and-gas permeable membrane covering the enzyme system. The assembly is over-wrapped with the exterior wrapper and, prior to heat-sealing the package, the oxygen content is reduced to a relatively low level, preferably to about 0.5%–4% by mechanical means such as well known gas flushing techniques with an inert gas such as nitrogen. The package is then sealed by heat and pressure to form a hermetically sealed package having a relatively low oxygen content. The moisture present in the packaged meat product, normally containing appreciable amounts of water-soluble glucose or material readily convertible to glucose, readily permeates the permeable paper membrane to contact and activate the enzyme system which then rapidly initiates and sustains the reaction of glucose with the small amount of free oxygen remaining in the package, thereby rendering the interior atmosphere essentially oxygen-free. Any small amount of oxygen which enters the package through the relatively impermeable outer wrapper during storage of the finished package is similarly removed by reaction with the oxygen-scavenging system and the package contents are maintained free from the deteriorating effects of oxygen for an extended period of time.

It has been found that the color and flavor of cured meat products such as luncheon meat packaged in the above manner are retained for substantially longer periods of time than when similar meats are packaged in an inert gas-flushed package without the presence of the composite supporting panel bearing the oxygen-scavenging enzyme system herein described.

In demonstration of the effectiveness of the above-described package of this invention, 6 to 8 ounce portions of freshly prepared sliced luncheon meat, containing substantial amounts of glucose added during the curing and flavoring processes customarily applied to this type of product, were placed on the tissue membrane surface of composite backing panels as hereinbefore described. The backing panels each carried, in the enclosed area under the tissue membrane, a blend of 2 milligrams of glucose oxidase and catalase of roughly equivalent activity (glucose oxidase-catalase activity ratio of 1.5 to 1) together with 23 milligrams of an 80–20 blend of lactose and glucose. The meat and the composite backing panel were overwrapped with a two-side polyvinylidene chloride lacquer coated cellophane having 20–30 pounds per ream of polyethylene extrusion-coated on the inside surface thereof, the package sealed except for a small access opening through which the package was flushed with nitrogen gas and thereafter hermetically sealed by heat and pressure. Control packages were similarly prepared using a plain polyethylene-coated paperboard backing board bearing no oxygen-scavenging enzyme system.

Analysis of the gas within the packages immediately following packaging revealed an oxygen content varying from 0.5% oxygen to 1.0% oxygen. After storage for 18 hours in the dark at 40° F., the oxygen content of the control packages was unchanged, while the packages containing the enzyme system were found to contain no free oxygen within the limits of accuracy of the analytical procedure (0.01%).

Upon storing both types of packages in a lighted, (fluorescent lighting 100 foot candle intensity—lights left on for 8 hours each day), refrigerated (40° F.) display case of the type commonly utilized in retail outlets for the display and sale of packaged meat products, it was found that the meat in the control packages developed a brownish off-color which became apparent after 2 to 3 hours storage and which increased in intensity as the storage time was lengthened. At the end of 3 days of storage, the meat was so badly browned as to be completely unsaleable. Simultaneously, a deterioration in flavor of the meat occurred. The flavor change was apparent to trained flavor experts after 3–8 hours of storage and the meat was badly off-flavor after 3 days of refrigerated storage in the illuminated meat storage cabinet. By contrast, the meat in the packages containing the composite supporting panel incorporating the enzyme system showed only very slight color fading after 3 weeks of storage under the above conditions, and showed no oxidative off-flavor during the same extended period. The only flavor change noted was a very slow and gradual decrease in the intensity of the meat flavor, without development of off-flavor. Analysis of the atmosphere within sample packages containing the enzyme system showed no appreciable oxygen present at any time.

The amount of the oxygen scavenging enzyme system which is necessary to give adequate protection to the luncheon meat in a package is dependent on several factors, principally the permeability of the outer wrapper to oxygen, the amount of free oxygen within the package when the package is sealed, the over-all size of the package and, of course, the strength or activity of the scavenger system as measured by its capacity to remove oxygen from the system.

Consumersized food packages generally utilized in the retail marketing of luncheon meats contain from about 4 to about 8 ounces of meat, 6 or 7 ounce packages being most common. The most satisfactory outer wrappers for such packages are flexible heat sealing sheet materials such as those previously mentioned which have oxygen permeabilities of less than 20 milliliters per square meter per 24 hours measured at 73° F. and 50% relative humidity. Normal gas flushing or vacuum packaging techniques quite readily reduce the free oxygen content of such packages to 1% or less. Under the above conditions of packaging, and in the presence of an excess of glucose, 1 to 3 milligrams of the glucose oxidase-catalase enzyme system is sufficient to accomplish the rapid removal of the last traces of oxygen from the package immediately after sealing and to prevent any deleterious effects from oxygen which permeates the outer wrapper during a storage period of up to three weeks.

If the package size is increased, the residual free oxygen is greater than the amount above specified, or if the outer wrapper has a high oxygen permeability than that specified, a larger amount of glucose will be required to react with the increased amount of oxygen and thus maintain the package free of oxygen. In such cases, it is also desirable to increase the amount of the active enzyme blend present in the package to as much as 10 milligrams in order to raise the number of centers of enzyme activity and thus increase the speed and efficiency of the oxygen removal.

If a package contains the active enzyme blend in an amount appreciably smaller than 1 milligram, erratic results in protective capacity are sometimes obtained. The non-uniform results obtained with these very small amounts of the catalytic enzymes are presumed to be due, at least in part, to spotty distribution of the enzymes on the backing board surface, the centers of enzyme activity thus being too localized for greatest efficiency in oxygen removal.

The effectiveness of the enzyme system is greatly reduced if the backing board is inverted so that the meat contacts the base backing board rather than the thin, porous paper sheet covering the enzyme system. Presumably this is due to the necessity for easy and rapid transfer of moisture and glucose from the meat product to the enzyme in order to activate the enzyme system.

It will be obvious that the enzyme system may be applied to the surface of the paperboard backing sheet in any of several ways, including a simple dusting of the dry blend in concentrated form or together with an inert, bulking diluent on the backing board surface, or by coating the enzyme blend, suspended in an inert, non-activating medium, with or without an added bonding agent, on the board surface. In any of the above modifications, the porous paper membrane is then superposed over the enzyme system and adhered in its marginal areas to the backing board. The enzyme application may be carried out in registered fashion so that application is only in the central portion of the board to which the porous sheet is not adhered, or may be in the form of an over-all coating or dusting, wherein the scavenger material is evenly distributed over the entire surface of the board. In the latter case, provision must be made to increase the amount of enzyme system for each unit section of backing board, since the portion of enzyme which is carried by the marginal sealing areas of the board will be destroyed or inactivated by the heat which is applied to those areas in sealing the porous paper membrane in covering relationship to the enzyme system on the backing board. The production of the composite backing panels will, in any case, preferably be a continuous operation utilizing a paperboard backing sheet and porous paper sheet in the form of roll stock and producing either separate individual composite backing panels or finished roll stock from which the individual panels may be cut as needed.

Having now shown and described specific embodiments of my invention, it will be apparent that various modifications may be applied without departing from the spirit thereof and the invention is not intended to be restricted except in accordance with the spirit of the appended claims.

This application is a continuation-in-part of application Serial Number 60,457, filed October 4, 1960, now abandoned.

I claim:

1. A food package comprising a moist, glucose-containing, cured meat product, a porous paper sheet on which said meat product is supported, a paperboard backing sheet coated with a thermoplastic water-repellant coating adhered in the peripheral areas on its coated side to said porous paper sheet, a dry, comminuted mixture comprising at least 1 milligram of glucose oxidase and catalase interposed between said porous paper sheet and said paperboard backing sheet, and a flexible packaging material wrapper hermetically sealed in enclosing relationship to said meat product and said supporting and backing sheets, said wrapper having a water vapor permeability of less than 10 grams per square meter per 24 hours measured at 100° F. and 90% relative humidity and a permeability to oxygen of less than 20 milliliters per square meter per 24 hours measured at 73° F. and 50% relative humidity, said mixture of glucose oxidase and catalase being present in an amount to effectively catalyze the reaction between glucose and oxygen in the package.

2. A consumer-sized food package comprising a moist, glucose-containing cured meat product, a porous paper sheet supporting said meat product, a paperboard backing sheet coated with a thermoplastic water-repellant coating adhered in the peripheral areas of its coated side to said porous paper sheet, a dry, comminuted enzyme system comprising from 1 to 10 milligrams of a mixture of glucose oxidase and catalase of approximately equal catalytic activity interposed between said supporting and backing sheets, and a flexible, heat-sealable packaging material wrapper having a water vapor permeability of less than 10 grams per square meter per 24 hours and a permeability to oxygen of less than 20 milliliters per square meter per 24 hours, both permeabilities being measured under standard conditions, hermetically sealed in enclosing relationship to said meat product and said supporting and backing sheets, said enzyme system being adapted to catalyze the reaction between glucose and oxygen in the package.

3. A package according to claim 2, wherein said enzyme system comprises between 1 and 3 milligrams of said mixture of glucose oxidase and catalase.

4. A food package comprising a moist, cured meat product, a composite backing panel supporting said meat product and a packaging sheet material wrapper enclosing said meat and said backing panel in sealed relationship and having in standard permeability tests a water vapor permeability of less than 10 grams per square meter per 24 hours and a permeability to oxygen of less than 20 milliliters per square meter per 24 hours, said backing panel comprising a paperboard backing sheet coated with a thermoplastic water-repellant coating and having adhered thereto at the peripheral areas of the coated side thereof a fibrous cellulose sheet freely permeable to water and oxygen, and having distributed between said sheets a dry composition of glucose, glucose oxidase and catalase, said glucose oxidase and catalase being present in such composition in amount of at least 1 milligram to catalyze the reaction between glucose and oxygen in the presence of moisture, said meat product being in direct contact with said fibrous cellulose sheet, whereby moisture from the meat may permeate the fibrous cellulose sheet and initiate the oxygen reactivity of said composition to establish and maintain an oxygen-free atmosphere within said package.

5. A composite supporting panel for inclusion in a hermetically sealed package of a moist, glucose-containing cured meat product, which panel comprises a paperboard backing sheet coated on at least one side with a thermoplastic water-resistant coating, a water and oxygen-permeable sheet material superposed on a coated side of said backing sheet and adhered thereto in the peripheral areas thereof, and between 1 and 10 milligrams of a dry composition of glucose oxidase and catalase of approximately equal catalytic activity interposed between the two said sheets, whereby said composition is adapted to catalyze the reaction between glucose and oxygen on permeation of moisture and glucose through said water and oxygen-permeable sheet material when said panel is included in said package.

6. A supporting panel for use in direct contact with a moist, cured meat product within a hermetically sealed flexible sheet material package, the panel comprising a paperboard backing sheet, a thermoplastic water-resistant coating on said backing sheet, an enzyme system comprising a dry, comminuted blend of glucose, glucose oxidase and catalase distributed on the coated surface of said backing sheet, said glucose oxidase and catalase being present in said blend in amount of at least 1 milligram to catalyze the reaction between glucose and oxygen when in the presence of moisture, and a water-and-oxygen permeable paper sheet material superposed over said enzyme system and adhered to said backing sheet in the areas adjacent the edges thereof.

7. A hermetically sealed package comprising a moist cured meat product, a composite backing panel supporting said meat product and a heat-sealable packaging sheet material having in standard permeability tests a water vapor permeability of less than 10 grams per square meter per 24 hours and an oxygen permeability of less than 20 milliliters per square meter per 24 hours enclosing said meat and said panel, said panel comprising a paperboard sheet coated on at least one side thereof with a thermoplastic water-repellent coating, a water and oxygen permeable fibrous cellulose sheet adhered to the edge areas of said coated side forming therewith a sealed pocket area, said pocket area containing a dry, comminuted composition of glucose, glucose oxidase and catalase adapted to react in the presence of water with the atmospheric oxygen present in said package, said glucose oxidase and catalase being present in said composition in amount of at least 1 milligram to catalyze the reaction between glucose and oxygen, said meat being in direct contact with said permeable cellulosic sheet whereby moisture from the meat is adapted to penetrate the permeable sheet to activate said composition to react with oxygen and to establish and maintain an oxygen-free atmosphere within said package for an extended period of time.

8. A method of packaging a moist cured meat product wherein an oxygen-free atmosphere is established and maintained for a substantial period of time within the resulting package which comprises supporting said meat product on a composite backing panel of paperboard coated with a water-resistant heat-sealable coating and having a superposed water-and-gas-permeable sheet material adhered thereto in the areas adjacent the edges thereof, said panel having distributed on said coating and between said paperboard and said water-and-gas-permeable sheet material a dry, comminuted composition of glucose, glucose oxidase and catalase adapted to react with free oxygen upon activation by water, said glucose oxidase and catalase being present in said composition in amount of at least 1 milligram to catalyze the reaction between glucose and oxygen, substantially completely enclosing except for an access opening said meat product while supported by said composite backing panel and in direct contact with said water and gas-permeable sheet material in a flexible, heat-sealable packaging sheet material having in standard permeability tests a water vapor permeability of less than 10 grams per square meter per 24 hours and a permeability to oxygen of less than 20 milliliters per square meter per 24 hours, reducing the oxygen content of the package to a level below 4% by removal of oxygen through said access opening and closing said opening to form a hermetically sealed package.

References Cited in the file of this patent

UNITED STATES PATENTS

| | | |
|---|---|---|
| Re. 23,523 | Baker | July 22, 1952 |
| 2,533,051 | Saunders | Dec. 5, 1950 |
| 2,765,233 | Sarett et al. | Oct. 2, 1956 |
| 2,808,192 | Raisin | Oct. 1, 1957 |
| 2,864,710 | Pottle et al. | Dec. 16, 1958 |
| 3,026,209 | Niblack et al. | Mar. 20, 1962 |